United States Patent
Mirski-Fitton et al.

(10) Patent No.: US 8,811,687 B2
(45) Date of Patent: Aug. 19, 2014

(54) NATURAL MEDIA IN DIGITAL REPRESENTATIONS

(75) Inventors: Alexander D. S. Mirski-Fitton, Winchester (GB); Edwin P. J. Moffatt, Winchester (GB); Ross B. Pavitt, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 13/215,070

(22) Filed: Aug. 22, 2011

(65) Prior Publication Data

US 2013/0051634 A1    Feb. 28, 2013

(51) Int. Cl.
*G06K 9/00*    (2006.01)

(52) U.S. Cl.
USPC .......................................... 382/119; 382/203

(58) Field of Classification Search
CPC ....................................................... G06K 9/00
USPC .......................................... 382/119, 203, 314
See application file for complete search history.

(56) References Cited

U.S. PATENT DOCUMENTS

| | | | |
|---|---|---|---|
| 5,767,860 A | 6/1998 | Zimmer et al. | |
| 6,307,955 B1 * | 10/2001 | Zank et al. | 382/121 |
| 6,836,267 B1 * | 12/2004 | Endo et al. | 345/174 |
| 6,870,550 B1 | 3/2005 | Schuster et al. | |
| 6,919,893 B2 | 7/2005 | Tobita et al. | |
| 7,158,138 B1 | 1/2007 | Bronskill et al. | |
| 7,236,180 B2 | 6/2007 | Dresevic et al. | |
| 7,602,396 B2 | 10/2009 | Asente et al. | |
| 7,602,405 B2 | 10/2009 | Hsu | |
| 7,636,097 B1 | 12/2009 | Holloway | |
| 7,696,998 B2 | 4/2010 | Bae | |
| 7,777,745 B2 | 8/2010 | Sander et al. | |
| 7,808,509 B2 | 10/2010 | Levene et al. | |
| 7,876,336 B2 | 1/2011 | Perani et al. | |
| 7,978,938 B1 * | 7/2011 | Wilensky | 382/311 |
| 2002/0028017 A1 * | 3/2002 | Munich et al. | 382/187 |
| 2004/0047495 A1 * | 3/2004 | Suchard et al. | 382/119 |
| 2007/0188793 A1 * | 8/2007 | Wakai | 358/1.14 |

OTHER PUBLICATIONS

"Graphics tablet—Wikipedia, the free encyclopedia", Aug. 15, 2011, http://en.wikipedia.org/wiki/Graphics_tablet#Operation.
"Riddlesofmind: Wacom Intuos4 pen stylus repair", Apr. 2011, http://riddlesofmind.blogspot.com/2011/04/wacom-intuos4-pen-stylus-repair.html, pp. 1-4.

* cited by examiner

*Primary Examiner* — Samir Ahmed
(74) *Attorney, Agent, or Firm* — Anthony V. S. England; Prentiss Johnson (57) ABSTRACT

According to embodiments of the invention, there is provided a computer program product, a method, and a system to clean an image produced by the system. A digital canvas representation of an initial condition is produced. A set of real-time digital information is captured to form an unconstrained digital representation of the set of real-time digital information. A constraining digital mask based on the digital canvas representation of the initial condition is applied to the unconstrained digital representation of the set of real-time digital information to form a constrained digital representation of the set of real-time digital information. The constrained digital representation of the set of real-time data is stored, allowing an application program to use the constrained representation of the real-time data.

23 Claims, 5 Drawing Sheets

NATURAL MEDIA IN DIGITAL REPRESENTATIONS

BACKGROUND

1. Field

The invention relates to a computing environment, and more particularly to a computer program, method, and system for integrating natural media, such as hand drawings, with digital images.

2. General Background

There are existing methods for producing a digital image. The digital image may be produced by scanning in the item of interest. The digital image may be captured by sensors in a "tablet" device, produced by a scanning machine, such as, a magnetic resonance imaging (MRI) device, an electrocardiography (EKG), an electroencephalogram (EEG), or a computerized axial tomography (CAT Scan/CT Scan) and the like. The scanned image is then available in some representation digitally. A digital image may also be produced by a user utilizing a stylus on a tablet. A digital image may also be produced by scanning a piece of paper into a computer.

SUMMARY

According to embodiments of the invention, there is provided a computer program product a method, and a system to initialize a digital canvas representation of an initial condition; to capture a set of real-time digital information; to form an unconstrained digital representation of the set of real-time digital information; to construct a constraining digital mask based on the digital canvas representation of the initial condition; to apply the constraining digital mask to the unconstrained digital representation of the set of real-time digital information to form a constrained digital representation of the set of real-time digital information; and to store the constrained digital representation of the set of real-time data, allowing an application program to use the constrained representation of the real-time data.

According to another embodiment of the invention, there is provided a system for drawing and cleaning a scanned image produced by the system. The system comprising a processor, an application, a scanner, a drawing device for drawing on a paper, and responsive to moving the drawing device on the paper, the drawing device producing a set of marking on paper and sending a set of sensor data to the application running on a processor to produce a constraining digital mask. Responsive to scanning the paper, the system cleaning the scanned image by utilizing the constraining digital mask.

DRAWINGS

The above-mentioned features of the present invention may be better understood, and its numerous objects, features, and advantages made apparent to those skilled in the art by taken in conjunction with the accompanying drawings wherein like reference numerals denote like elements and in which.

DETAILED DESCRIPTION

Embodiments of the invention are described below with reference to drawings in detail.

When a natural drawing on a piece of paper is scanned into a computer to form a digital image, the image representation on the computer captures irregularities on the paper. This can be, for example, a wrinkle, a hand print, or a smudge of ink. The irregularities can be manually edited out with existing image editing software. Existing scanning software may provide options to vary the brightness and contrast of an image, which can be used to improve the definition between desired and accidental elements. However, with these options, the changes are applied to the whole scanned image, and as such the desired lines are affected also, degrading their natural feel and the accuracy of the representation of what the user drew. In contrast, this invention automates the clean up to produce an improved digital representation of the drawn image that does not result in the loss of natural-media feel for most drawing media.

In view of the deficiencies in prior art, various method, system, and computer program product embodiments of the invention are provided herein. This invention creates a digital mask representing a constraint and applies the digital mask representing the constraint to an unconstrained representation of a set of real-time data to form a constrained representation of the set of real-time data. The first example embodiment applies the invention to a drawn image.

Figure 1:
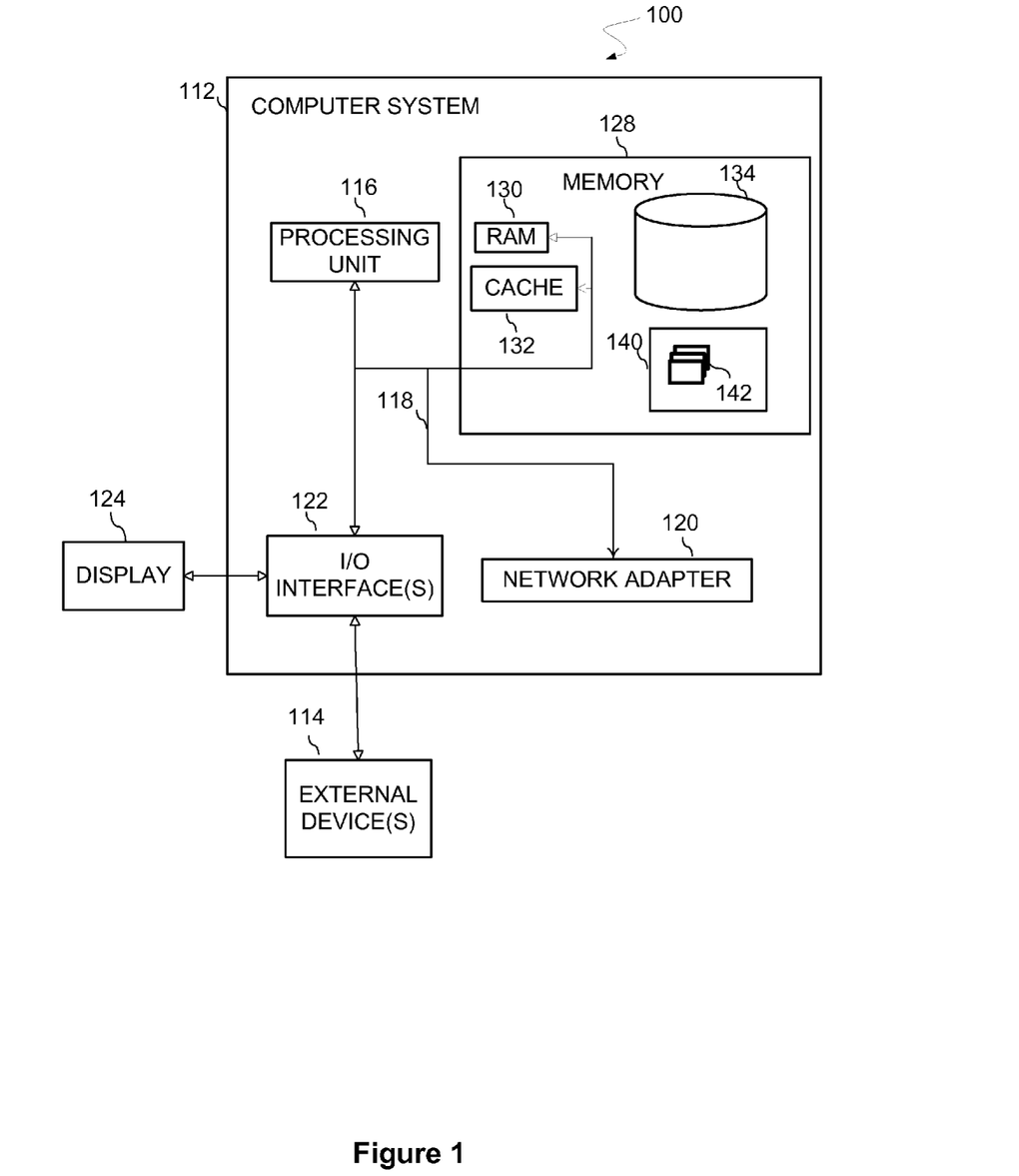
FIG. 1 depicts a computer system 100 according to an embodiment of the present invention and is a block diagram example of a data processing system in which the methods described herein can be implemented.

Referring to FIG. 1, a schematic of a processing system 100 is shown wherein the methods of this invention may be implemented. The processing system 100 is only one example of a suitable system and is not intended to suggest any limitation as to the scope of use or functionality of embodiments of the invention described herein. Regardless, the system 100 is capable of implementing and/or performing any of the functionality set forth herein. In the system 100 there is a computer system 112, which is operational with numerous other general purpose or special purpose computing system environments or configurations. Examples of well-known computing systems, environments, and/or configurations that may be suitable for use with the computer system 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 112 may be described in the general context of computer system-executable instructions, such as program modules, being executed by a computer system. Generally, program modules may include routines, programs, objects, components, logic, data structures, and so on that perform particular tasks or implement particular abstract data types. The computer system 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 112 in the system environment 100 is shown in the form of a general-purpose computing device. The components of the computer system 112 may include, but are not limited to, a set of one or more processors or processing units 116, a system memory 128, and a bus 118 that couples various system components including the system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 112 typically includes a variety of computer system readable media. Such media may be any available media that is accessible by the computer system 112, and it includes both volatile and non-volatile media, removable and non-removable media.

The system memory 128 can include computer system readable media in the form of volatile memory, such as random access memory (RAM) 130 and/or a cache memory 132. The computer system 112 may further include other removable/non-removable, volatile/non-volatile computer system storage media. By way of example only, a storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the system memory 128 may include at least one program product having a set (e.g., at least one) of program modules 142 that are configured to carry out the functions of embodiments of the invention.

A program/utility 140, having the set (at least one) of program modules 142, may be stored in the system memory 128 by way of example, and not limitation, as well as an operating system, one or more application programs, other program modules, and program data. Each of the operating systems may have one or more application programs, other program modules, and program data or some combination thereof, and may include an implementation of a networking environment. The program modules 142 generally carry out the functions and/or methodologies of embodiments of the invention as described herein.

The computer system 112 may also communicate with a set of one or more external devices 114 such as a keyboard, a pointing device, a display 124, a tablet, a digital pen, etc. wherein these one or more devices enable a user to interact with the computer system 112; and/or any devices (e.g., network card, modem, etc.) that enable the computer system 112 to communicate with one or more other computing devices. Such communication can occur via Input/Output (I/O) interfaces 122. These include wireless devices and other devices that may be connected to the computer system 112, such as, a USB port, which may be used by a tablet device (not shown). Still yet, the computer system 112 can communicate with one or more networks such as a local area network (LAN), a general wide area network (WAN), and/or a public network (e.g., the Internet) via a network adapter 120. As depicted, a network adapter 120 communicates with the other components of the computer system 112 via the bus 118. It should be understood that although not shown, other hardware and/or software components could be used in conjunction with the computer system 112. Examples include, but are not limited to: microcode, device drivers, redundant processing units, external disk drive arrays, RAID systems, tape drives, and data archival storage systems, etc.

Figure 2:
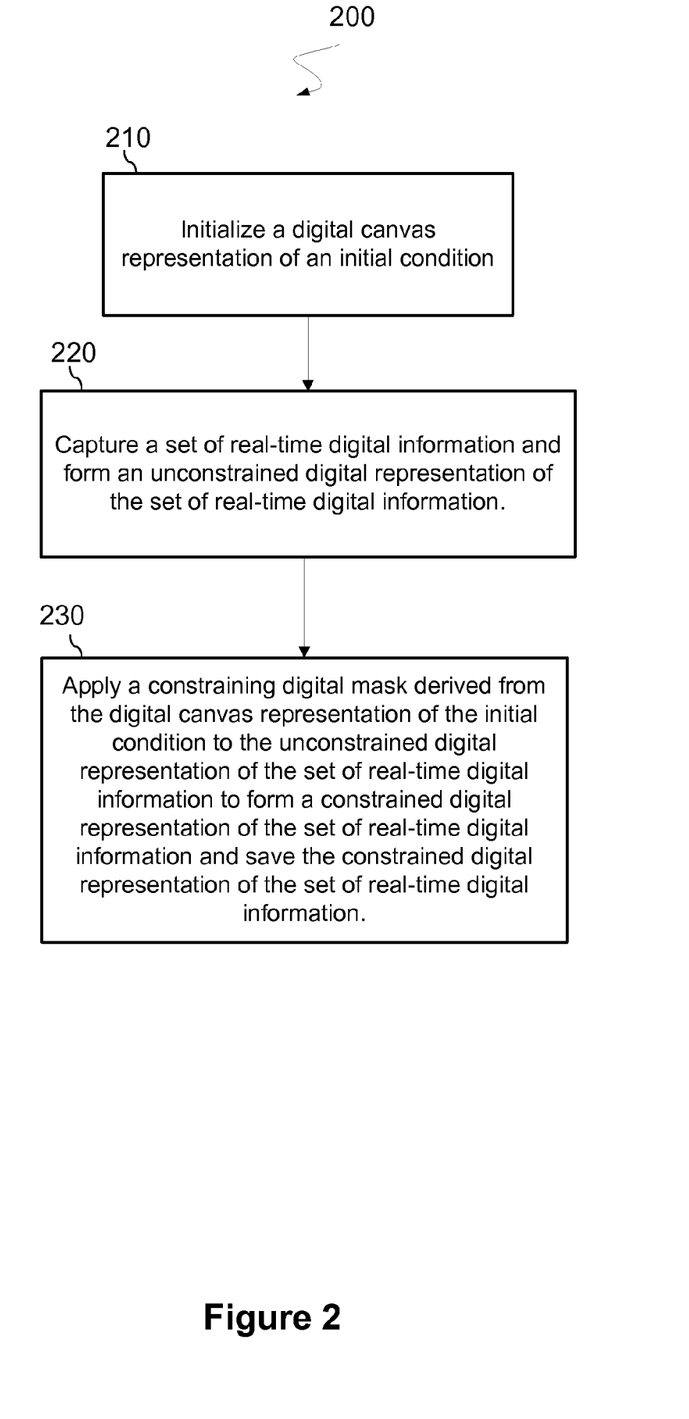
FIG. 2 illustrates a process 200 that may be utilized for automating clean up of an unconstrained digital representation of real-time digital information to a constrained digital representation of the real-time digital information.

FIG. 2 illustrates a process 200 that may be utilized for automating clean up of an unconstrained digital representation of real-time digital information to a constrained digital representation of the real-time digital information. In a first example embodiment, the image is produced by a hand drawing on a tablet scanned into a computer.

In a typical digital painting software application, there is a work area on the screen designated for drawing or painting, the "digital canvas." When a user clicks a mouse on the digital canvas, a mark is created. The format of the mark, including size, shape, color, etc., is determined by the digital brush that is selected. For example, a pencil tool may leave a single small mark; whereas, a paintbrush tool may be changed into bigger or smaller circles and leave these "paint marks." A click and drag of a mouse paintbrush may be used to create these digital brush marks on every point of the digital canvas that the cursor passes over.

In a typical pen and stylus application, pressing the stylus to the tablet affects a click similar to digital painting software. The pressing and moving of the stylus on the tablet draws lines on the digital canvas as long as the cursor is positioned over the digital canvas during drawing. To achieve this, the surface of the tablet is mapped to the area of the screen. For example, holding the stylus at the top left of the tablet would normally place the cursor at the top left of the screen etc. However, a pen and stylus are not just a replacement for a mouse as they often have additional features such as the ability to detect the pressure that the user is exerting as they draw. Digital painting applications may use this to vary the shape of the digital brush dynamically. So as the user clicks and drags to draw a line, the pressure data gathered and other features of the system may be used to vary the size, shape, color, and the like of the digital brush.

Figure 3:
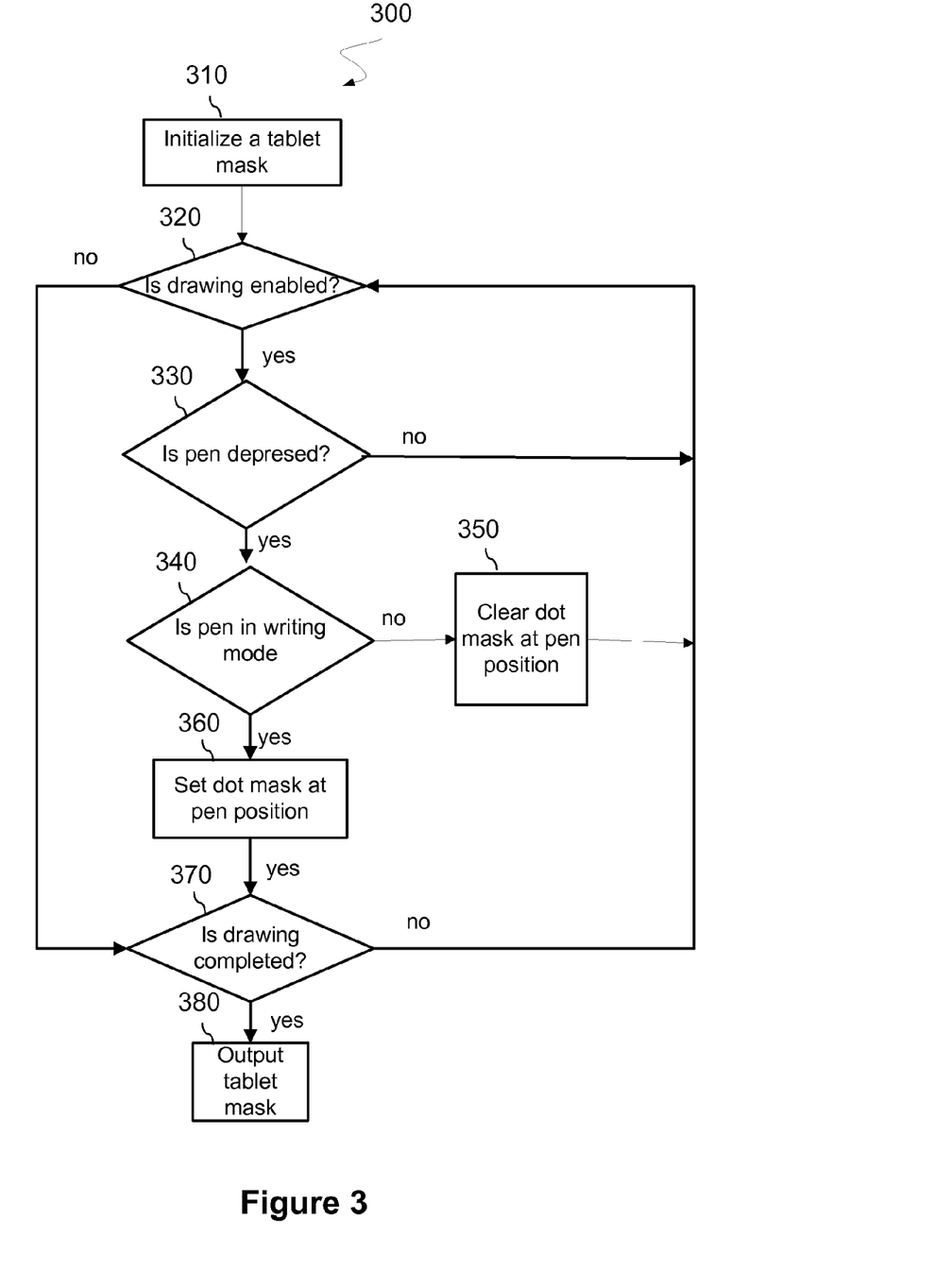
FIG. 3 illustrates a process 300 for producing a tablet mask in a first example embodiment of the invention herein comprising the drawn image used in the process 200.

In an example embodiment, different masks are created during the process. Once drawing mode is enabled, the whole surface of the tablet maps to a digital canvas. This digital canvas is assigned properties, such as its height, width, and resolution. These properties normally default to sensible values, such as the actual height, width, and resolution of the tablet. The corners of the tablet map to the corners of the digital canvas, but between the corners, the mapping may vary. For example, a single point on the tablet might correspond to a set of points on the digital canvas, or vice versa. The allowable variations would depend on the resolution of the digital canvas, the degree of precision of the tablet, and user preferences, which may be configured with the supported user interface. The following items are illustrative only to better explain the process:

A raw media mask or tablet mask is an exact map of everywhere on the tablet that was touched and not then erased. The resolution of the tablet mask is the same resolution that the tablet is capable of detecting, and its size is the same as the tablet. Each mark created by the stylus contacting the tablet is a single unit in size, where a unit is the smallest variation in position that the tablet can detect. This is essentially the raw data collected by the stylus and tablet. FIG. 3 depicts a process for creating the tablet mask.

Figure 4:
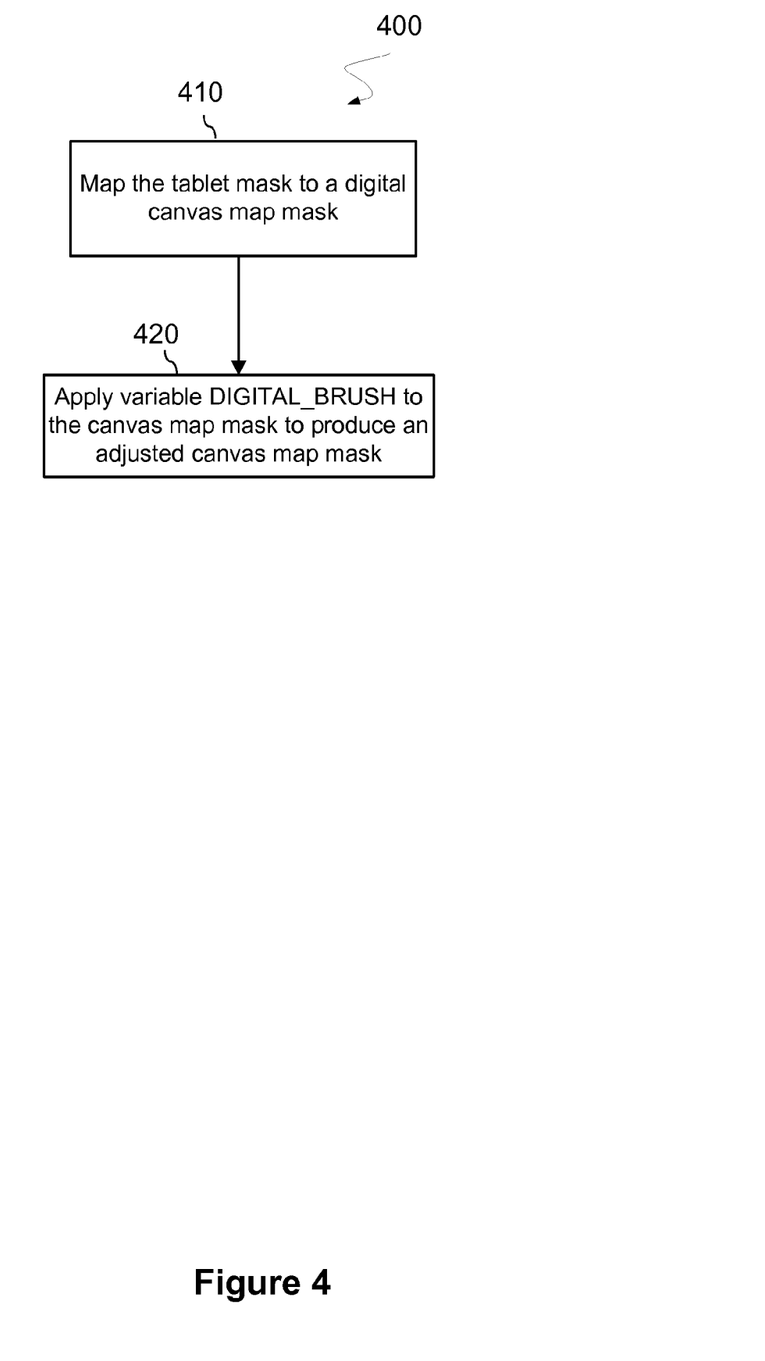
FIG. 4 illustrates a process 400 for adding digital brush strokes to a canvas mask in the first example embodiment of the invention herein comprising the drawn image used in the process 200.

The digital canvas mask represents the natural media. In the first example embodiment, this is the paper used for drawing. The digital canvas mask has the resolution of the digital canvas. FIG. 4 depicts a process for creating an adjusted canvas mask based on mapping a set of digital brush strokes during the drawing in the first example embodiment of this invention to the digital canvas mask.

Figure 5:
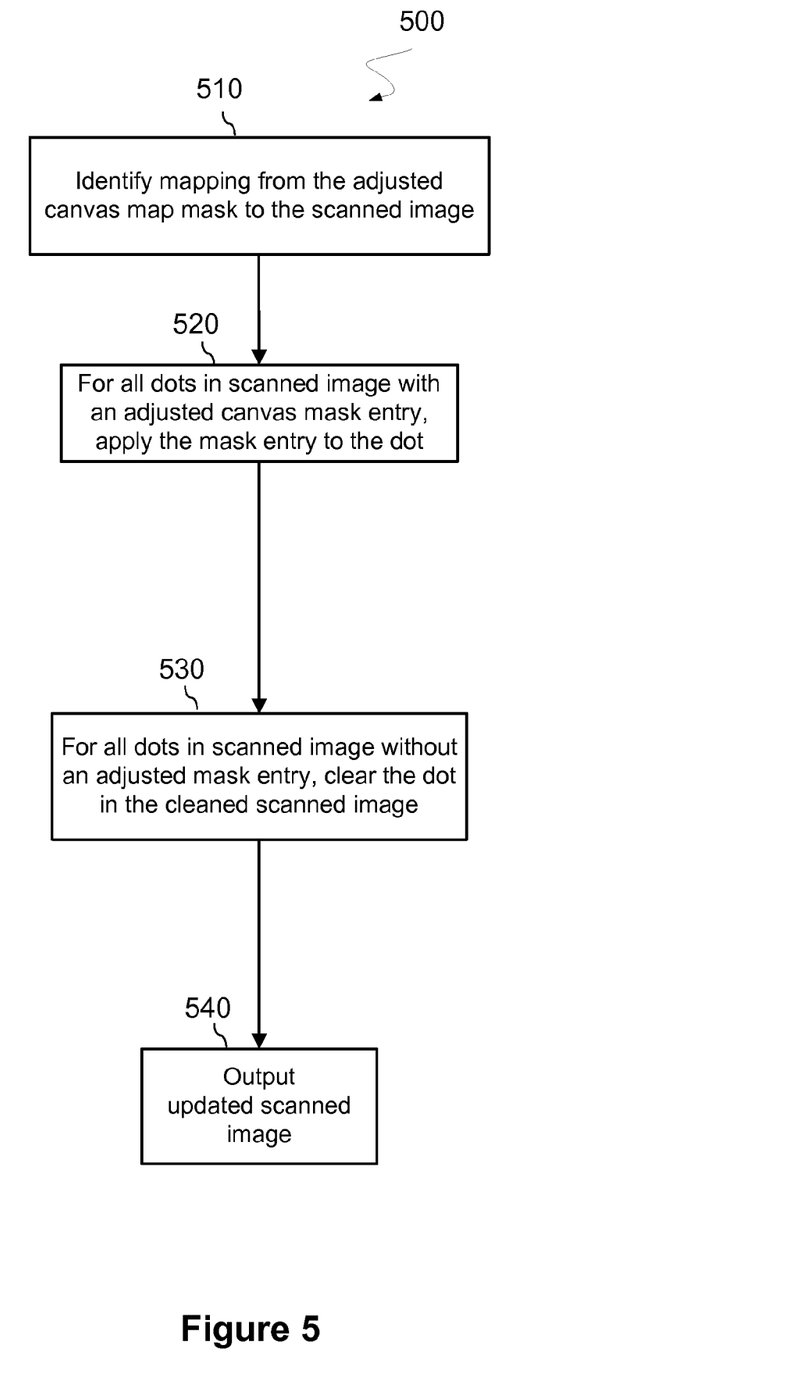
FIG. 5 illustrates a process 500 for cleaning the image in the first example embodiment of the invention herein comprising the scanned drawn image using the adjusted canvas mask produced by applying all brush strokes to the canvas mask.

FIG. 5 depicts a process for applying the digital canvas mask created in process 4 to a scanned drawing in the first example embodiment of this invention.

The process 200 begins at a step 210 where a starting condition for a digital canvas is initialized. The initial digital canvas representation is a digital representation of an initial condition, a starting condition, or a constraint. After the digital representation of the initial condition is initialized, the process continues to a step 220, where a set of real-time digital information is captured to form an unconstrained digital representation of the set of real-time digital information. In a first example embodiment, this is information captured by drawing on a graphics tablet. In a second example embodiment, this is sensor data captured by a machine.

After the set of unconstrained digital representation of the set of real-time digital information is captured, the process continues to a step 230 where a digital mask derived from the digital canvas representation of the initial condition is applied to the unconstrained digital representation of the set of real-time digital information to form a constrained digital representation of the set of real-time digital information. The constrained digital representation is saved for subsequent usage. The constrained digital representation is expected to take less space and provide a better representation of the real-time data. This process is better understood by example embodiments which are further described.

In the first example embodiment, the digital canvas representation of the initial condition is the digital representation of an initial condition of a page. In the first example embodiment the page is fixed to a graphics tablet. The page may be initially blank or the page may have a known image or starting initial conditions with a known digital representation. Examples of an initial page include, but are not limited to: a page of a legal document requiring a signature, a page of a form to be filled out, or a page with a header, for example a logo. The initial digital representation may take a variety of formats, including, but not limited to .pdf, .tif, and .jpg formats. In the first example embodiment, the entire page is represented. However, in a different example, only a portion of the page may be processed. In the partial page example, the entire page may be constructed by processing separately each piece of the page and combining the pieces to form the whole page.

In the first example embodiment, various tablets may be used and various types of papers may be used. The tablet is a pressure sensitive device where a pen designed for the tablet has ends that can be replaced. A standard tablet pen has a writing end with a replaceable nib and an erasing end with a replaceable eraser. The replaceable nib is replaced with a replacement nib that actually writes. Instead of directly writing on the surface of the tablet, the pen is used to draw on the paper attached to the surface of the tablet. Many tablets already allow for placing a piece of paper on the tablet surface. Although, the sensitivity to pressure from the stylus is reduced by putting the paper between the stylus and the tablet, most tablets can be calibrated. The calibration compensating for the reduction may be supported through firmware utilities or by application programs accepting input from the stylus.

In the first example embodiment, a new tip which allows it to leave marks on the paper is placed on the nib of the stylus.

By writing on an actual paper surface and drawing, the user has an improved experience as there is friction and drag, allowing a more natural feel. There is an actual marker experience against real paper. In an embodiment, the tablet receives the indication of the type of marker via previously supported interfaces. The tablet receives and processes the pressure transferred through the paper to the tablet. In another embodiment, the pen itself provides information to the system as to its color and adjustments to pressure. The angle of the pen, the pressure applied, and mode setting in the pen or the application in the computer receiving information from the pen determines the digital representation of the pen touching the paper as a user is drawing utilizing the pen.

After a first digital canvas is initialized in the step 210, the process proceeds to the step 220, where the set of real-time digital information is captured. In the first example embodiment, the set of real-time digital information is the information being processed by drawing on the paper attached to the tablet. The drawing comprises any action that produces markings on the page, which includes, but is not limited to: marking, sketching, writing, signing, tracing, and the like. The control of the marking could be done by a person or an automated process, such as, an assembly line or other machinery, such as, a robot. With the paper attached directly to the tablet, the position of the pen on the paper translates to the position of the pen on the tablet and the position of the brush strokes on the digital canvas, that is, the paper. The movement of the pen sends sensor data to the system which captures the position as well as optionally other sensor data, such as, the speed of pen movement, the angle of the pen against the paper, the pressure of the pen against the paper. Different embodiments of the invention described herein reflecting different sensor information may affect the algorithm for producing the unconstrained digital representation of the set of real-time digital information.

In the first example embodiment, in addition to the real-time data captured by drawing, a tablet mask identifying which units on the tablet have drawing information and which units on the tablet do not have drawing information is constructed. Additional details regarding the process for creating the tablet mask are further described in process 300. The digital canvas mask represents the natural media. In the first example embodiment, this is the paper used for drawing. The digital canvas mask has the resolution of the digital canvas. FIG. 4 depicts a process for creating an adjusted canvas map mask based on mapping a set of digital brush strokes during the drawing in the first example embodiment of this invention to the digital canvas.

After capturing the set of real-time digital information and forming an unconstrained digital representation of the set of real-time digital information, the process continues to the step 230, where a constraining digital mask derived from the first digital mask is applied to digital representation of the set of data collected in the step 220. In an example the first digital mask is null, empty, or representing a blank page, the constraining digital mask may be formed during the step 220 while capturing the set of real-time digital information. In the second example embodiment, the constraining digital mask is the first digital mask representing the initial conditions in the step 210.

In the first example embodiment, representing the drawing on a page starting from an initial condition, the image may always be added to the page regardless of the real-time data collected in the step 220. Alternatively, the real-time data collected in the step 220 may be allowed to erase or modify the initial conditions. The determination may be configuration selections or GUI selections. Similarly, the completion of the real-time collection in the step 210 may trigger the step 230 where the constraining digital mask is applied. In the case of the first example embodiment, the triggering of the application of the constraining mask in the step 230 may be indicated by various means such as, but not limited to, selecting a menu item on a GUI, issuing a command, or selecting a button on the digital pen. In the first example embodiment, the drawn image is scanned into the computer using a scanner. The constraining mask is derived from the initial condition from the step 210 and the adjusted canvas map mask from step 420. FIG. 5 further depicts the process for applying the digital canvas mask created from step 420 to the scanned drawing in the first example embodiment of this invention. Application of the digital canvas mask created from step 420 to the image may be automated by the supporting user interface and a user step, such as, scanning the image. Alternatively, there may be steps the user follows to identify the image and apply the mask. Alternatively, the removal of the paper from the tablet or the scanning of the paper containing the image into the computer may trigger the step 230 where the constraining mask is applied.

In the first example embodiment, the steps result in the creation of a physical drawing and a digital mask representing the areas of that drawing that the user *wants* to be there. The steps concurrently produce a method for ignoring any noise or undesired marks, details or artifacts. When the physical image is scanned, it is then processed using the digital mask to create the final image: a digital representation of the physical drawing comprised data that is taken from the scanned image, and pure transparency i.e. a "cleaned up" version of the user's line art, ready to be used in digital artwork, that still maintains the look and feel of natural media.

In the second example embodiment, the image is produced by collecting a set of sensor data. For example, a bed with weight sensor data provides an outline of an article or a person. A digital picture of the article or the person is masked by the weight sensor data indicating the digital shape or outline of the article or the person. Referring to the step 210, the first digital mask representing an initial condition or constraint is the digital representation identifying the outline of the article or the body. Referring to the step 220, the set of real-time data is the set of sensor information received by an application running on a computer. The sensors information is collected from a monitoring machine or a scanning machine, such as, a medical device, including, but not limited to an x-ray, a MRI, EEG, EKG, a CT scan, etc. With these examples, the set of real-time digital information is the unconstrained digital representation of the sensor data collected and normally produced.

Referring to the step 230, in the second example embodiment, the constraining digital mask is the initial digital canvas identified in the step 210. The application of the constraining digital mask is excluding any data collected in the step 220 outside of the area of the body. By applying the constraining digital mask, the scan or picture may be reduced to only represent the article or the person. The data not needed, that is, the black space or noise around the edges of the article or the person, is discarded, reducing the storage space required for the image. The invention described herein may be applied to reduce the space required to hold medical records.

FIG. 3 depicts a flow for a process 300 for creating a tablet mask in the first example embodiment reflecting the drawing of an image on a tablet. The process 300 starts at a step 310 where a tablet mask is initialized. In an example embodiment, the initial tablet mask is a bit mask for every bit that can be represented on the tablet and the mask is cleared or set to zero.

After the page is fixed to the graphics tablet in step 210, the user initiates drawing. This may be the act of drawing, that is, pressing the stylus on the paper and moving the stylus on the paper. Alternatively, drawing may be initiated by an interface or a trigger indicating the start of the drawing. Various user interfaces may be used, for example, a graphical menu with various buttons used to configure the drawing program may be supplied where a specific button selection is used to initiate drawing. In another example, a command or program is started by the user. In yet another example interface, the attachment of the paper to the tablet initiates the drawing mode and the removal of the paper from the tablet terminates the drawing mode.

In an example embodiment, there is also a "stop" or "pause" feature which would allow the user to make some marks on the paper without the software modifying the tablet mask. In this example, a hotkey is used on a computer keyboard. In another example embodiment, the stylus itself has a pause feature. This pause feature may also stop the writing, for example by retracting the lead with a mechanical pencil-like feature. However, the movement of the stylus may still be tracked. Having the ability to stop/start the mask editing is not essential.

In this example embodiment, only one bit per unit is required. The tablet mask indicates whether the unit has any marking at all. There is no need to record variations in the data. However, an example embodiment may capture the original encodings. In those embodiments, it may be assumed that the number of bits for a unit is fixed or there is some mapping algorithm which maps a position to an encoding for the unit. With these example embodiments, for a given coordinate on the page indicated by a horizontal or X coordinate and a vertical position or Y coordinate, the bit encoding representing a unit is found by a mapping to the start of the representation of the unit using the coordinate values as indexes. Although various mapping may be used, it is assumed that the mask represents each unit on the tablet. The process proceeds to the step 320, where a determination is made if drawing is enabled. Drawing may be enabled by a menu selection, pressing a button, or simply starting to draw on the paper attached to the tablet. If the drawing is enabled, then the process continues to a step 330. Otherwise drawing mode is not enabled and the process continues to a step 370. At the step 330, a determination is made if the pen is depressed. If the pen is depressed then the process continues to a step 340. Otherwise, the pen is not depressed and the process 300 continues to the step 320. At the step 340, a determination is made if the pen is in a writing mode. Writing mode is typically reflective of which end of the pen is being pressed with a first end having a writing nib indicating writing mode and a second end with an erasing nib, indicating an erasing mode. In one embodiment, the user identifies the mode via a selection in a GUI. In another embodiment, the distance of the end of the pen to the tablet indicates the writing mode, where the end that is closer to the tablet determines the mode. In another embodiment, the pressure on the specific tip provides a signal to the computer as to which tip is being used. The signal may be wirelessly transmitted to the computer by the pen stylus. In this case, the pen itself contains a power source and all information about pressure, positioning, tilt etc. is transmitted to the computer via this connection.

If in the step 340, the determination is made that the pen is in writing mode, then the process continues to a step 360, where the individual unit at the pen position is set if needed. The individual unit at the pen position may be set unconditionally without regard to its current state. If in the step 340, the determination is made that the pen is not in writing mode, then the process continues to a step 350 where the individual unit mask at the pen position is cleared if needed. The individual unit mask entry may be set cleared unconditionally without regard to its current state. After completing the step 350 the process continues at the step 320. After completing the step 360, the process proceeds to the step 370 where a determination is made if the drawing is completed. In an embodiment, the indication that drawing completed is signaled by the user. Various user actions may be used to indicate the drawing is completed. The actions could be, but are not limited to, the de-selection of the menu item previously selected indicating entering drawing mode, issuing a command, or scanning the drawing. If at the step 370, the determination is made that the drawing is not completed, then the process continues at the step 320. If at the step 370, the determination is made that the drawing is completed, then the process continues at a step 380 where the tablet mask is output and the process 300 is finished.

FIG. 4 depicts a process 400 for applying a brush stroke to an adjusted canvas map mask in the first example embodiment where a drawing is made on the page attached to the tablet. The process 400 starts at a step 410 where the tablet mask output from the step 380 is mapped to a digital canvas map. In the first example embodiment, the digital canvas map is the representation of units on the page attached to the tablet. In a traditional tablet and stylus system, as a drawing is made on the tablet, a digital representation of the drawing is captured by the system and the drawing is reflected on the tablet or the computer screen. The digital representation turns the user interactions into bit encodings having a separate encoding for each unit being drawn. Each stroke of the stylus is translated to a position on the screen and has a set of units representing the entire movement of the digital pen. In the case of a blank sheet, in an example embodiment, the initial digital canvas is cleared to represent the blank page in the step 210. In another example embodiment, the initial digital canvas is set to blanks in step 210 to represent the blank page. In the case of an initial non-blank page, with an initial digital representation, the initial digital canvas is initialized to a bit map in step 210 of the initial digital image. In an embodiment where the digital image is initialized to an initial image, the paper would typically have the initial image on the paper before drawing additional marks on the paper. However, the initial digital image may be applied later. Other mappings may be used and other representation may be used. For example, there may be only a portion of the page that is represented by the tablet mask. In a different embodiment, there may be margins or the size of the paper may vary.

The pressing of the pen and movement of the pen produces not only the drawing on the paper, but also the digital representation of the brush stroke. DIGITAL_BRUSH is a variable representing the mapping of a digital brush stroke on the tablet to the digital canvas, that is the page affixed to the tablet. Depending on the configured size and resolution of the digital canvas, this may result in what was a single "point" in the tablet mask becoming more or less than a single "point" in the digital canvas. A point in the digital canvas is the smallest variation in position that the digital canvas is capable of recording. This is the resolution of the digital canvas. After the step 410 completes, the process continues at a step 420 where a representation of the bitmap of the brush stroke, DIGITAL_BRUSH is received by the system. Each unit in DIGITAL_BRUSH represents units on the tablet. However each unit on the tablet may have a different representation on the digital canvas or the paper. Each unit on tablet maps to a position on the paper. However, the DIGITAL_BRUSH is a replacement of each unit on the tablet with a representation on the digital canvas. The DIGITAL_BRUSH could be for example, a 5 "point" diameter circle. The digital brush may vary as a user is drawing. A typical variation would increase the diameter of a circle representation as the pressure increases. Another typical variation would change the shape as the angle of the stylus against the tablet varies.

Note that a screen representation of a "point" is called a "pixel." The tablet and/or the digital canvas may very well have different sized "points" as represented on the screen. A "point" is simply the smallest variation in position that the device is capable of distinguishing.

Since the physical picture drawn and the supporting resolution of the tablet might not match exactly, a DIGITAL_BRUSH is used to provide a user configurable proximity bias that changes the mapping to better reflect the actual mapping. If the natural media spreads out more when it touches the paper, a wider DIGITAL_BRUSH is used. If the natural media fades as it spreads out, the DIGITAL_BRUSH fades to transparency around the edges.

Using the tablet mask produced in the step 380 as a base and mapping this mask to the digital canvas, where some of the points on the digital canvas have been set as described in process 300 to represent where the stylus touched the physical canvas. The following is applied at step 420 in process 400:

1) Variable DIGITAL_BRUSH (as described above) is set.
2) For each point set in output tablet mask mapped to the digital canvas.
3) Apply the DIGITAL_BRUSH to form an adjusted canvas map mask centered at the point.

It is likely that there will be more set points in the adjusted canvas mask than there were on the output tablet mask. The goal of replacing points set in the tablet mask with a digital brush is to introduce the aforementioned proximity bias. The size of the brush is increased in the case where the mark the user is making on the paper spreads out and fades the edges from black to transparency smoothly. The objective is to have 100% of the scanned image data to be taken at the centre of a stroke, and this percentage lowers as the outer edge of the stroke is reached.

Various embodiments and support may be implemented. For example, support may take into account of the pressure sensitivity or tilt data from the tablet at this stage. The DIGITAL_BRUSH is altered according to the data before the mark is placed in the adjusted canvas map mask. For example, if pressure is between 0 and 1, the support could make the DIGITAL_BRUSH a circle with diameter (3*PRESSURE), where an increase in PRESSURE results in a wider mark in the adjusted canvas map mask. There may be user selectable mappings and calibrations. For example, an initial drawing with variations may be made and the scanned images may be used to provide calibrations and default mappings for a specific person or for a specific profile.

After drawing is completed, the adjusted canvas map may be utilized to clean a scanned image as show in FIG. 5.

FIG. 5 depicts a flow for a more detailed process 500 for applying the digital mask in step 230 to the scanned image in the first example embodiment of a picture being drawn on a tablet. After the drawing is completed and process 400 has produced the adjusted canvas map mask 420, the drawing is scanned, to produce a scanned image SI. The scanned image SI is represented by a digital SI bitmap. At a step 510, a mapping between the scanned image SI and the adjusted canvas map mask is produced. Although the digital SI bitmap may take many forms or representations, it is assumed that the digital SI bitmap can be converted to an internal format where each bit in the bitmap represents a bit on the page of paper scanned. Similarly, the adjusted canvas map mask produced in step 420 also may be converted to an internal format where each bit in the adjusted canvas map mask also represents a bit on the original paper fixed to the graphics tablet in step 210. This mapping may take various forms. In one embodiment, they are both converted to the same format where each bit has a corresponding entry in the adjusted canvas map mask. In another embodiment, the correspondence requires a conversion step. In one embodiment, both the adjusted canvas digital mask and the scanned image have the same mapping and no conversion is required. In another embodiment, the conversion of either or both of the bit maps to a common format may be done using conversion software. Various scaling and best fitting technologies may be used to ensure the best mapping. In an example embodiment, where there is an initial starting digital representation, a best match for finding an unchanged starting mask within the digital mask may be used. In an example embodiment, the large majority of the adjusted canvas map mask and scanned image are very close as they differ in only some irregularities such as smudges and wrinkles on the paper. The subset of the mask should have an excellent fit within the scanned image. Once a mapping is determined, the process proceeds to a step 520 where for each unit in the scanned image having a corresponding adjusted canvas mask entry, the mask entry is applied to the unit. Depending on the embodiment, this may simply be an overlaying of the adjusted mask entry over the original unit entry. In another embodiment, a function identified in the step 510 is applied. The process then proceeds to the step 530 where all units in the scanned image without a corresponding mask entry are cleared. This step may take various embodiments. In one embodiment, where the adjusted canvas mask entry and the scanned image have the same format, the adjusted canvas mask unit entry overlays the scanned image unit entry. After completing the step 530, the process proceeds to the step 540, where the cleaned image is output for future usage.

A standard tablet pen has a writing end with a replaceable nib and an erasing end with a replaceable eraser. The replaceable nib is replaced with a replacement nib that actually writes. There are many tablet and stylus products currently available for sale, by way of example only and not in any way intended to limit the scope of the invention, such as, the Wacom® Intuos, Wacom Intuos4, or Wacom Bamboo which may be modified to produce markings as well as provide digital information required for the invention discussed herein. (Wacom is a registered trademark of Wacom Co. Ltd.) Instead of directly writing on the surface of the tablet, the pen is used to draw on the paper attached to the surface of the tablet. The drawings may be lead, paint, or pen technology based. Any method for updating paper with markings may be used. Some example implementations include having graphite or a lead based nib allowing a pencil drawing. Alternatively, a pen nib could be dipped in ink or charcoal. A brush nib could be dipped in paint, etc. Pressing and moving the stylus against the paper still register as input to the graphics tablet and still create marks on the digital canvas. In addition, pressing and moving the stylus against the paper also creates marks on the physical "canvas" i.e. the sheet of paper. The user now receives better feedback while drawing, because the user can see what is being drawn on the natural media, that is, the page in front of them. If the material used to modify the tip of the nib is one that can be erased (e.g. graphite or some inks), the eraser tip on the other end of the stylus could be similarly modified. So now when the user erases marks from the digital canvas, marks on the physical canvas can also be erased. While the physical erasure may be imperfect with some residue or indentations left behind, the digital erase will be perfect, and so when the mask is applied after scanning the physical drawing, any imperfections will be removed from the final digital image.

An example embodiment comprises strapping or affixing the writing method to the exterior of the stylus.

The nibs for a stylus are usually made of plastic, and normally last a long time. For example, replacing the nib once a year is reasonable. An approach for modifying the nib would be to replace a portion of the length of the nib with lead. Currently, the inside of a stylus is largely occupied by a long, thin circuit board. Since this runs down the center of the casing (to minimize the form factor of the pen), this circuit board would be displaced slightly to achieve the desired result, so that the lead can run down the centre of the barrel and out through the hole in the nib.

In order to avoid having to replace the nib frequently, a solution similar to a retractable pencil is used. With this approach, a stick of lead is fed into the stylus and then a button on the outside of the stylus controls how much of this is pushed out.

In an embodiment, the plastic nib is modified as follows:
The writing-end of the nib is flattened off, making it slightly shorter.
A narrow hole is drilled through the centre of the nib.
A mechanism is added to the stylus that allows a stick of "lead" to be fed through this hole and extended or retracted.

Similarly, retractable pencils often have replaceable erasers and the eraser end of the stylus would be modified to work like these. So instead of having a smooth rounded tip, it would end in a metal rim, into which eraser tips can be secured. This approach requires no rearrangement of the internals of the pen.

In another embodiment, the nibs are replaced with felt-tips with various colors. The felt-tips would be assembled in a manner similar to the mechanical pencil approach above. In this case, the felt-tips are fed through a hole in the center of the stylus (with a wider tip exposed outside). This felt tip would then be fed by a cartridge of ink as a regular felt-tipped pen works, where the cartridge is stored in the barrel of the stylus where there is space around the edges of the circuit board to fit such a cartridge in.

Another example embodiment is to have a metal tip on the nib with a score down the center just like a traditional drawing pen that is then dipped in a pot of ink to draw.

Various replacement styluses for use with a graphics tablet may be supplied. In one example, a replacement stylus may be designed to feel like an airbrush, so flow and pressure can be controlled via dials on the outside of the stylus as well as by the pressure exerted on the tablet. Any existing or future stylus should be able to be modified to provide physical markings as well as to provide digital data reflecting the movement of the stylus on the paper. There are existing styluses that detect the pressure exerted by the stylus against a surface and that can report that information. Adding a wireless interface to transmit the information to the computer allows this stylus to be used directly on paper without requiring the tablet. Various means may be used to identify the position of the stylus on the digital canvas. An interface allowing a user to identify the starting position or a camera on the stylus could be used to identify the starting position.

The usage of the invention described herein may be utilized for various applications. For example, in applications where someone's identity is to be verified by their signature, and a hard copy of the signed document must be kept (for example in the fields of medicine (prescriptions) or banking), the invention herein facilitates a more effective system. If the document was signed on a tablet, a pad or clipboard making use of the invention described herein, then the constraining digital mask in the step 230 may be applied to the signature. In an embodiment of this invention, the sensor data captured to form the unconstrained digital representation of the set of real-time digital information in the step 220 includes shape, speed, stroke order, and pressure. The captured information along with the cleaned signature may be utilized for a process automatically verifying signatures using historical data for an individual. This process improves the reliability and security related to automatically verifying a signature. Specifically, comparing the invention herein to other approaches:

1. Scanning the signature and analyzing the shape. With the use of security cameras, speed and stroke-order of a signature could also be traced. The disadvantage here is that the scanned image will suffer from artifacts that will either:
   a) Need to be edited out before the shape-matching phase of signature verification is carried out
   b) Will be left as noise which invariably makes the shape-matching less accurate (or means that it needs to be more leniently calibrated).

The advantage of invention herein is that it gathers data about pressure levels applied to the page throughout the signature, allowing for more accurate and secure verification.

2. Signing on an electronic device, then printing out the signature (e.g. as used when mail is delivered and needs a signature on receipt). The key disadvantage of this method is that people simply find it harder to write with a stylus on a screen than with a pen on paper for the same reason that many artists will prefer to sketch in natural media, people are generally more comfortable signing in natural media. This is important because the awkwardness introduced by using an uncomfortable input method means that the user's signature can be significantly different. The normal validation including shape-matching, pressure detection, and speed-checks on this signature may have problems due to the different media. However, the invention described herein improves on this: not only is the mask that is generated equivalent to the digital signature created by this prior method (or rather, the mask applied to a black area is equivalent), but also additional data can be gathered making the verification more comprehensive. In addition, the method described herein involves a more comfortable input method for the user, making it more likely to have a better quality input to work with, making verification more accurate and effective by reducing the required leniency of calibration.

Storage of medical data is another example of usage of invention described herein. Hospitals often need to store a lot of data because they must retain many large image files (for example x-rays). This drives up their costs as they must purchase additional disk space in their datacenters to deal with the storage requirements. If a patient is lying down while having a scan taken, the bed they lie on could be adapted to collect pressure data which would determine the shape of the person's body (as an outline). Then when the scan is taken it could be automatically masked with the pressure data, and in one step the unnecessary data (black space or noise around the edges of the person) could be discarded, reducing the storage space required for the image. This is something that could easily be achieved in post processing, but the invention described herein allows for it to be achieved automatically and in one step, saving time, effort or storage space for the hospital, any of which is a useful application.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the apparatus and method have been described in terms of what are presently considered to be the most practical and preferred embodiments, it is to be understood that the invention need not be limited to the disclosed embodiments. The invention is intended to cover various modifications and similar arrangements included within the spirit and scope of the claims, the scope of which should be accorded the broadest interpretation so as to encompass all such modifications and similar structures. The present invention includes any and all embodiments of the following claims.

We claim:

1. A computer program product for cleaning digital information, the computer program product comprising: non-transitory computer readable storage medium having computer readable program code embodied therewith, the computer readable program code comprising:
    computer readable program code configured to receive a first set of unconstrained real-time digital information generated by a device sensing pressure of a medium upon the device, where the pressure sensed by the device includes pressure produced on the medium by a physical object;
    computer readable program code configured to receive a second set of digital information, wherein the second set of digital information is generated by a scanning device scanning the medium after the first set of unconstrained real-time digital information is generated
    computer readable program code configured to construct a constraining digital mask based on the first set of unconstrained real-time digital information; and
    computer readable program code configured to select at least a portion of the second set of digital information by applying the constraining digital mask to the second set of digital information.

2. The computer program product of claim 1, wherein the medium includes paper and the pressure on the medium by a physical object includes pressure of a stylus on the paper.

3. The computer program product of claim 2, wherein the stylus includes a marking device that leaves a set of markings on the paper responsive to motions of the stylus pressing on the paper.

4. The computer program product of claim 1, wherein the medium includes a body of a living being, the pressure of the medium on the device includes pressure from weight of the body on the device and the first set of unconstrained real-time digital information includes a digital representation representing an outline identifying a shape of the body.

5. The computer program product of claim 2, wherein the first set of unconstrained real-time digital information represents at least one shape that varies with the pressure of the stylus on the paper.

6. The computer program product of claim 1, wherein the computer readable program code is configured such that the first set of unconstrained real-time digital information represents at least a signature.

7. The computer program product of claim 6, wherein the computer readable program code further comprises computer readable program code configured for analyzing the first set of unconstrained real-time digital information according a collected history and providing an assessment of validity of the signature based on comparing the first set of unconstrained real-time digital information to the collected history.

8. A method for cleaning digital information comprising:
    capturing a first set of unconstrained real-time digital information generated by a device sensing pressure of a medium upon the device, where the pressure sensed by the device includes pressure produced on the medium by a physical object;
    capturing a second set of digital information, wherein the second set of digital information is generated by a scanning device scanning the medium after the first set of unconstrained real-time digital information is generated;
    constructing a constraining digital mask based on the first set of unconstrained real-time digital information; and
    selecting at least a portion of the second set of digital information by applying the constraining digital mask to the second set of digital information.

9. The method of claim 8, wherein the medium includes paper and the pressure on the medium by a physical object includes pressure of a stylus on the paper.

10. The method of claim 8, wherein the stylus includes a marking device that leaves a set of markings on the paper responsive to motions of the stylus pressing on the paper.

11. The method of claim 8, wherein the medium includes a body of a living being, the pressure of the medium on the device includes pressure from weight of the body on the device and the first set of unconstrained real-time digital information includes digital information representing an outline identifying a shape of the body.

12. The method of claim 9,
wherein the first set of unconstrained real-time digital information represents at least one shape that varies with the pressure of the stylus on the paper.

13. The method of claim 8,
wherein the first set of unconstrained real-time digital information represents at least a signature.

14. The method of claim 13, further comprising:
analyzing the first set of unconstrained real-time digital information according a collected history; and
providing an assessment of validity of the signature based on comparing the first set of unconstrained real-time digital information to the collected history.

15. A system for cleaning digital information, comprising:
a processor;
an application running on the processor;
the application configured to capture a first set of unconstrained real-time digital information generated by a device sensing pressure of a medium upon the device, where the pressure sensed by the device includes pressure produced on the medium by a physical object;
the application configured to capture a second set of digital information, wherein the second set of digital information is generated by a scanning device scanning the medium after the first set of unconstrained real-time digital information is generated;
the application configured to construct a constraining digital mask based on the first set of unconstrained real-time digital information; and
the application configured to select at least a portion of the second set of digital information by applying the constraining digital mask to the second set of digital information.

16. The system of claim 15,
wherein the medium includes paper and the pressure on the medium by a physical object includes pressure of a stylus on the paper.

17. The system of claim 15,
wherein the stylus includes a marking device that leaves a set of markings on the paper responsive to motions of the stylus pressing on the paper.

18. The system of claim 15,
wherein the medium includes a body of a living being, the pressure of the medium on the device includes pressure from weight of the body on the device and the first set of unconstrained real-time digital information includes a digital representation representing an outline identifying a shape of the body.

19. The system of claim 16,
wherein the first set of unconstrained real-time digital information represents at least one shape that varies with the pressure of the stylus on the paper.

20. The system of claim 15,
wherein the application is configured such that the first set of unconstrained real-time digital information represents at least a signature.

21. The system of claim 20,
wherein the application is configured to analyze the first set of unconstrained real-time digital information according a collected history and to provide an assessment of validity of the signature based on comparing the first set of unconstrained real-time digital information to the collected history.

22. A system for drawing and cleaning a scanned image comprising:
a processor;
an application program including instructions for execution by the processor;
a drawing device to draw on a paper;
the system configured such that, responsive to moving the drawing device on the paper, the drawing device produces a set of marking on the paper and sends a set of sensor data to the application program executing on the processor to produce a constraining digital mask;
a scanner to scan the set of marking on the paper and produce a scanned image; and
the system configured such that, responsive to scanning the paper, the constraining digital mask is utilized to clean the scanned image.

23. The system of claim 22, wherein the drawing device includes a tablet and stylus and wherein the stylus includes a marking device for making markings on paper.

\* \* \* \* \*